Patented Dec. 12, 1922.

1,438,869

UNITED STATES PATENT OFFICE.

HENRY B. SLATER, OF RIVERSIDE, CALIFORNIA.

LEACHING COPPER AND LIKE ORES.

No Drawing. Application filed April 7, 1921. Serial No. 459,235.

*To all whom it may concern:*

Be it known that I, HENRY B. SLATER, a citizen of the United States of America, residing at Riverside, in the county of Riverside and State of California, have invented certain new and useful Improvements in Leaching Copper and like Ores, of which the following is a specification.

The present invention relates to the leaching of ores for the purpose of producing a solution containing the metal values of the ores, and is particularly applicable to the extraction of copper from its ores, for the subsequent recovery from the said solution of the metal values by any suitable process.

Sulfide ores of copper, in order to be amenable to leaching by sulfuric acid, have to be subjected first to an oxidizing roast or a chloridizing roast in order to convert the copper compounds into compounds which are readily attacked by dilute sulfuric acid.

Accordingly, in the leaching of copper from sulfide ores, it has been the usual custom to subject the sulfide ores to a suitable roasting operation, which may be a sulfatizing roast, a dead roast or a chloridizing roast, and with certain classes of ore, it is extremely difficult to get complete conversion of the sulfides by this operation. Accordingly, when such ores are roasted, and then leached with sulfuric acid, any sulfides remaining in the roasted product will not ordinarily be leached by the acid. While, of course, it would be possible to dry the leached residue and then subject the same to a second roasting operation, this would not be ordinarily feasible in commercial practice on account of the great amount of heat which would be required to drive off all of the water from the leached tailings.

In order to complete the extraction of such oxidized ore containing an unoxidized (sulfide) portion, I preferably proceed as follows: The ore, which may be largely (but not absolutely completely) oxidized, is subjected to the action of dilute sulfuric acid in excess, this acid dissolving all of the copper which exists in the form of sulfate and a large part of the copper which exists in the form of oxide, but does not dissolve the copper which is in the form of sulfid. The bulk of the acid leach solution is then drawn off from the ore and to the ore, containing some free acid and water is then added an oxidizing agent, preferably sodium hypochlorite or calcium hypochlorite, these reagents preferably being in the form of a relatively concentrated solution. More sulfuric acid may be added if desired, but is ordinarily not necessary. The mixture of ore material and acid leach solution remaining and hypochlorite solution are preferably agitated more or less until the reaction is complete or substantially complete. The sulfuric acid remaining in the ore readily reacts with the hypochlorite to form a sulfate and hypochlorous acid, which latter readily reacts with the sulfide of copper in the ore, giving a substantially complete extraction of the copper.

The first acid leach solution, after being withdrawn from contact with the ore, may be added to another batch of unleached ore to utilize the content of the free acid remaining in this leach liquor. The leach liquor from the hypochlorite treatment may likewise be brought into contact with another batch of ore material to utilize its content of free acid.

The first acid leaching solution containing sulfuric acid and the second acid leaching solution may be brought together, after treatment with ore, and used upon a further quantity of ore. The final pregnant solution will be purified in any suitable manner, and can then be run into an electrolytic vat, for the precipitation of the copper therefrom, with the regeneration of sulfuric acid suitable for use in leaching additional quantities of ore.

In the above description I have referred to the treatment of sulphide ores containing copper, by roasting in an appropriate manner, then leaching with sulfuric acid and then while the ore still contains sulfuric acid, treating with a hypochlorite to attack the copper remaining in the ore from the sulfuric acid treatment.

The process is also applicable to ores which contain copper in any form in which a substantial proportion of the copper is not readily leachable by sulfuric acid, an example of such other ores would be ores containing porphyry or native copper ores. The process is likewise applicable to the treatment of concentrates or tailings, such as those produced in flotation processes.

While the process has been referred to in connection with the treatment of sulfid ores including copper, it is also applicable to the treatment of ores containing other metal sulfid ores, such as those of zinc, lead, or silver, or mixed ores containing copper and one or more of these, with or without gold.

For the purpose of more completely explaining the nature of the invention the following examples are given, it being understood that the invention is not restricted to these examples:

Michigan ore tailings.

The ores of the Michigan district all carry their copper as native or metallic copper but the tailings from the concentration tables, as well as the "sands" so-called, that are now being recovered from the lakes, where they have been lying discarded for years, all carry some oxidized mineral, and because of this, the attempts at recovery by flotation have not been very successful. In addition to the oxidized copper, also there is more or less lime in these tailings and sands.

Analysis.

| Cu | $SiO_2$ | $Fe_2O_3$ | $Al_2O_3$ | CaO | MgO | Total |
|---|---|---|---|---|---|---|
| 0.66% | 41.79% | 12.48% | 23.64% | 16.90% | 3.97% | 99.26% |

Of the copper content 26.5 is soluble in $H_2SO_4$ and of the remaining copper 91.4% is soluble in the hypochlorite solution after the acid solution is drawn off. The total extraction equals 96.68%.

Second Michigan ore material.

This is designated under the names "flotation heads" and "flotation tails."

The "flotation heads" is representative of the table tails from the concentration mill. The "flotation tails" is representative of the tailings from the flotation process adopted for the recovery of the copper from the table tails.

Flotation heads carried Cu=0.785% equals 15.70 lbs. per ton.

Flotation heads carried CaO=2.1%.

Flotation tails carried Cu=0.33% equals 6.6 lbs. per ton.

Flotation tails carried CaO=2.75%.

By flotation less than 60% of the copper in the ore is recovered. Over 40% of it is going to waste.

My experiments repeatedly prove the practical extraction of more than 90% of the copper content of the flotation heads or better than 14 lbs. per ton. This is better than could be recovered by flotation.

Arizona ore.

This ore represents a fair sample of the "porphyries" of the Southwest, upon which much effort is being expended for the application of the flotation process. Flotation being applicable to the extraction of the sulphides but not so the carbonates, silicates and oxides. For these compounds of copper various schemes of "sulphidizing" have been suggested. That is, after the sulphides have been removed by the flotation process, then the pulp remaining is treated with a sulphide, such as sulphide of sodium or the like, and then treated by flotation for the extraction of the sulphides that have been formed by the addition of the sulphidizing solution. This means a second stage in the flotation operation with the necessary mechanical handling in each stage.

This ore carries copper as sulphides and oxidized compounds. Apparently some cuprite and some chalcopyrite, but mostly as chalcocite, azurite, malachite and chrysocolla.

Sulphuric acid has but very little action upon the sulphides but acts freely upon the carbonates, silicates and oxides.

Hypochlorous acid has but little, if any, action on the oxides, carbonates or silicates, but acts powerfully and rapidly on the sulphides. The products of oxidation of a sulphide by hypochlorous acid are hydrochloric and sulphuric acids and these act vigorously upon the carbonates, silicates and oxides of copper.

Action of hypochlorous acid on chalcocite.

$Cu_2S$ plus $4HClO$ equals $2CuCl$ plus $H_2SO_4$ plus $2HCl$.

$Cu_2S$ plus $5HClO$ equals $2CuCl_2$ plus $H_2SO_4$ plus $HCl$ plus $H_2O$.

Upon a pure mineral the efficiency would be 2Cl for each Cu, but on a mixed ore, containing oxides, carbonates, and silicates as well as chalcocite, the sulphuric and hydrochloric acids act as leaching agents and then the efficiency of the reaction will be 4Cl for each 6Cu.

Second Arizona ore, consisting of sands and slimes.

The "sands" in this case is the ore crushed to pass a 30 mesh screen, for "table concentration," and the "slimes" is irreducible material, of impalpable fineness, from which nothing further of value can be extracted by the ordinary methods of concentration.

Analysis of sands.

| Cu | S | $SiO_2$ | $Fe_2O_3$ | $Al_2O_3$ | CaO | MgO | Loss on ignition |
|---|---|---|---|---|---|---|---|
| 3.65% | 0.51% | 63.64% | 3.53% | 16.77% | Trace | 0.83% | 10.98% |

Of the copper content 56.16% is soluble in 5% $H_2SO_4$ and of the remaining copper 88% is recoverable by use of the hypochlorite solution, added to the pulp after draining off the major part of the sulphuric acid solution. The total extraction is 94.5%.

Analysis of slimes.

| Cu | S | SiO | $Fe_2O_3$ | $Al_2O_3$ | CaO | MgO | Loss on ignition |
|---|---|---|---|---|---|---|---|
| 1.66% | 0.49% | 57.91% | 2.60% | 22.28% | Trace | 1.76% | 13.26% |

Of the copper content 33.73% is soluble in 5% $H_2SO_4$ and of the remaining copper 90% is soluble in the hypochlorite solution, added to the pulp after draining off the sulphuric acid solution. The total extraction from the slimes by my process being 93.3% of the copper content.

Chilean copper ore.

This ore, because of the large per cent of oxidized mineral has presented a serious problem for its successful treatment and only a part of its copper is soluble in an acid solution.

Analysis.

| Cu | $SiO_2$ | $Fe_2O_3$ | $Al_2O_3$ | CaO | MgO |
|---|---|---|---|---|---|
| 3.14% | 48.13% | 8.96% | 17.43% | 3.51% | 2.85% |

| $K_2O$ | NaO | $CO_2$ | S | $H_2O$ | Total determined |
|---|---|---|---|---|---|
| 2.99% | 5.60% | 6.04% | 0.92% | 0.40% | 99.97% |

Of the copper content 54% is soluble in $H_2SO_4$ and of the remaining copper 87% is soluble in the hypochlorite solution after draining off the acid solution. Total extraction equals 94%.

Mixed ores, concentrates, or tailings.

The process is accordingly adapted for the treatment of mixed sulphide and oxidized ores of copper without the need of a preparatory calcining or roasting.

The process consists of, or embodies, the following steps:

First: Reduction, by grinding, to a suitable fineness.

Second: Leaching with sulphuric acid for the extraction of the oxidized portion of the copper, leaving in the pulp sufficient of the acid for the reactions of the next step.

Third: Leaching with a solution of a hypochlorite of sodium or calcium, which solution, being acted upon by the residuary acid of the previous step, is productive of hypochlorous acid which in oxidizing the sulphides of copper in the ore is productive of sulphuric acid and hydrochloric acid and they dissolve the oxides of copper thus formed.

The solution used in the third step (in the various modifications given) should preferably also contain a sufficient amount of common salt to hold in solution all of the cuprous chloride formed in the reaction.

Hypochlorite solutions as ordinarily produced may in some cases contain a sufficient amount of common salt for the purpose, for example a solution of sodium hypochlorite made from bleaching powder ordinarily will contain rather more of sodium chloride than of sodium hypochlorite. It is to be understood that any deficiencies of sodium chloride can easily be made up by adding common salt to the hypochlorite solution used or to the ore pulp remaining after a considerable amount of the sulfuric acid leaching solution has been drawn off.

In connection with the leaching of roasted ores, by dilute sulphuric acid in excess, it may be noted that in ordinary ore roasting operations in which sulfid ores are treated, the roasting is carried to a point at which the major part of the sulphur is oxidized sometimes to sulfate and sometimes to sulfur dioxid, and sometimes partly to sulfate and partly to sulfur dioxid. These roasted ores, even when considered by the metallurgist as being "completely" roasted, usually carry a small amount of sulfur in the form of sulfid, which cannot be oxidized without excessive loss of time and excessive waste of fuel.

I claim:

1. A process of leaching metal values from material containing such values existing therein, in part at least, as sulfid, which comprises reacting upon such material with an acid leaching solution in excess, and thereafter reacting thereupon with a chlorin-oxygen compound in the presence of free acid.

2. A process of leaching metal values, from material containing such values existing therein, in part at least, as sulfid, which comprises reacting upon such material with an acid leaching solution in excess, and thereafter reacting thereupon with an oxidizing reagent in the presence of an acid, such mixture being capable of liberating a chloridizing reagent.

3. A process of leaching metal values from material containing such values existing therein, in part at least, as sulfid, which comprises reacting upon such material with an acid leaching solution in excess, and thereafter reacting thereupon with a hypochlorite material in the presence of an acid which is capable of displacing hypochlorous acid from its salts.

4. A process of leaching metal values from copper-bearing material containing some sulfide, which comprises reacting upon such material first with a sulfuric acid leaching solution, the acid being in excess, and thereafter reacting upon the residue with a hypochlorite in the presence of free sulfuric acid.

5. A process of leaching copper values from copper bearing material containing a portion of its copper content in a form in which it is not readily soluble in dilute sulfuric acid which comprises first leaching the said material with sulfuric acid leaching solution, the acid being in excess and thereafter reacting upon a residue with hypochlorous acid compound.

In testimony whereof I affix my signature.

HENRY B. SLATER.